United States Patent
Leach et al.

(10) Patent No.: US 10,044,673 B2
(45) Date of Patent: Aug. 7, 2018

(54) PROTECTING COMMUNICATION LINK BETWEEN CONTENT DELIVERY NETWORK AND CONTENT ORIGIN SERVER

(71) Applicant: Fastly, Inc., San Francisco, CA (US)

(72) Inventors: Sean A. Leach, Castle Pines, CO (US); Artur Bergman, San Francisco, CA (US); Thomas J. Daly, Nashua, NH (US)

(73) Assignee: Fastly, Inc., San Francisco, CA (US)

(*) Notice: Subject to any disclaimer, the term of this patent is extended or adjusted under 35 U.S.C. 154(b) by 104 days.

(21) Appl. No.: 14/806,317

(22) Filed: Jul. 22, 2015

(65) Prior Publication Data

US 2017/0026338 A1    Jan. 26, 2017

(51) Int. Cl.
*H04L 29/12*    (2006.01)
*H04L 29/06*    (2006.01)

(52) U.S. Cl.
CPC .......... *H04L 63/02* (2013.01); *H04L 61/2092* (2013.01); *H04L 61/2539* (2013.01); *H04L 61/2007* (2013.01); *H04L 61/2038* (2013.01); *H04L 61/2061* (2013.01); *H04L 63/1441* (2013.01)

(58) Field of Classification Search
CPC . H04L 63/02; H04L 63/1441; H04L 67/1095; H04L 61/2539; H04L 61/2092; H04L 61/2007; H04L 61/2038; H04L 61/2061
See application file for complete search history.

(56) References Cited

U.S. PATENT DOCUMENTS

| | | | |
|---|---|---|---|
| 8,464,334 B1* | 6/2013 | Singhal | H04L 63/0414 726/13 |
| 9,197,604 B1* | 11/2015 | Quilter | H04L 61/2592 |
| 2004/0010601 A1* | 1/2004 | Afergan | H04L 29/06027 709/229 |
| 2014/0098662 A1 | 4/2014 | Jungck et al. | |
| 2015/0058976 A1 | 2/2015 | Carney et al. | |
| 2016/0028765 A1* | 1/2016 | Lingafelt | H04L 63/1458 726/23 |

* cited by examiner

Primary Examiner — Meng Li

(57) ABSTRACT

A privatized link between an origin server and a content delivery network is provided. A privatized link can be direct connection that does not route over the internet. Another privatized link is one that rotates IP addresses. An origin server may be assigned to use a set of multiple IP addresses for communication with the content delivery network. However, at any given time, the origin server is only using a small number of IP addresses. When one of the IP addresses being used to communicate with the content delivery network comes under attack, the origin server switches to another IP address in the set in order to continue serving content to the content delivery network via an IP address that is not under attack.

13 Claims, 6 Drawing Sheets

PROTECTING COMMUNICATION LINK BETWEEN CONTENT DELIVERY NETWORK AND CONTENT ORIGIN SERVER

TECHNICAL FIELD

Aspects of the disclosure are related to the field of packet communication networks and delivery of content from a source server to content servers.

TECHNICAL BACKGROUND

Internet web pages, online information, and media content such as audio, video, photographs, and the like are requested and delivered to end users via computer network systems. Requests for the content are sent over the network to a source server, processed, and the content is delivered to the end user via the network. The source server can include origin or hosting servers which originally host the network content. Unfortunately, a single source server may not be able to serve a large number of concurrent requests for content. In addition, the requesting server may be distant geographically or network routing-wise from the source server. This can slow the process of delivering content to the point where users are dissatisfied, or abandon the request for content.

To address this problem, content delivery networks were developed. Content delivery networks cache content from a source server (a.k.a. origin server) for more rapid and reliable delivery to end users. A content delivery network may have many content nodes (up to thousands) distributed across a large geographic area (or network routing area) in order to provide faster, lower latency, and more reliable access to content for the end users, regardless of their geographic or network location.

The content delivery process begins with a user submitting a request to a browser. When a user enters a uniform resource locator (URL), a domain name system (DNS) request is triggered and an IP address is retrieved. In a content delivery network structure, the domain name of the URL is translated by a mapping system into the IP address of content server, which can have the content cached locally, to serve the content to the user. If the content is cached by the content server, the content server can directly service the end user's request. If the content is not cached in the content server, or the content from the origin server is out-of-date or stale, the content server can receive the content from the origin server and cache it. Once cached, the content server can typically provide the content quickly.

An origin server, however, may be the subject of a malicious attack. If, while under attack, the origin server is unable to provide the content to the content server, many of the advantages and functions of content delivery network can be disrupted.

Overview

Systems, methods, apparatuses, and software for ensuring delivery of content from an origin server to a content delivery network are disclosed herein. In one example, a method of protecting an origin server website from attack is disclosed. The method includes providing a content delivery network (CDN) having a set of content servers (CS) to provide content delivery on behalf of a set of participating content providers. The at least one of the set of content providers source content for delivery by the CDN from an origin server. A privatized link between at least one of the set of content servers and the origin server is provided.

In another example, a communication system includes a content delivery network (CDN) having a set of content servers (CS) to provide content delivery on behalf of a set of participating content providers. At least one of the set of content providers is to source content for delivery by the CDN from an origin server. The communication system also includes a privatized link between at least one of the set of content servers and the origin server.

In another example, a method of supplying content to a content delivery network (CDN) includes establishing a communication link between an origin server and a CDN using a first IP address for the origin server. The origin server is to provide content to the CDN by responding to requests from the CDN directed to the first IP address. The method also includes determining that the first IP address is under attack. The method also includes, in response to determining the first IP address is under attack, selecting a second IP address to be associated with the origin server. The method also includes establishing a communication link between the origin server and the CDN using the second IP address for the origin server. The origin server is now to provide content to the CDN by responding to requests from the CDN directed to the second IP address.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the views. While multiple examples are described in connection with these drawings, the disclosure is not limited to the examples disclosed herein. On the contrary, the intent is to cover all alternatives, modifications, and equivalents.

DETAILED DESCRIPTION

Network content, such as web content, typically comprises text, hypertext markup language (HTML) pages, pictures, digital media content, video, audio, code, scripts, or other content viewable and rendered by an end user device in a browser or other specialized application. This network content can be stored and served by origin servers that are owned or operated by content originators. When content servers (a.k.a., content servers) or a content delivery network are employed, such as in FIG. 1, the content servers can act as proxies that cache network content for delivery to end user devices. The content servers can maintain recently accessed and popular content as cached from the origin servers. Thus, content servers exchange data with the origin servers when new or un-cached information is requested by the end users, or if the content source data has changed. An origin server, however, may be the subject of a malicious attack. For example, the IP address of the origin server may be subject to a denial of service (DoS) or distributed denial of service (DDos) attack. If the attack is successful, the origin server would be unable to provide the content to the content server and the many advantages and functions of content delivery network would be disrupted.

In an embodiment, a privatized link between an origin server and the content delivery network is provided. One example of a privatized link is a direct connection that does not route over the internet. Because this connection does not route over the internet, it is more immune to attacks that come from the internet. Another privatized link is one that rotates IP addresses. For example, an origin server may be assigned to use a set of multiple IP addresses for communication with the content delivery network. However, at any given time, the origin server is only using a small number (e.g., 1 or 2) of IP addresses. When one of the IP addresses being used to communicate with the content delivery network comes under attack, the origin server switches to another IP address in the set in order to continue serving content to the content delivery network via an IP address that is not under attack.

Figure 1:
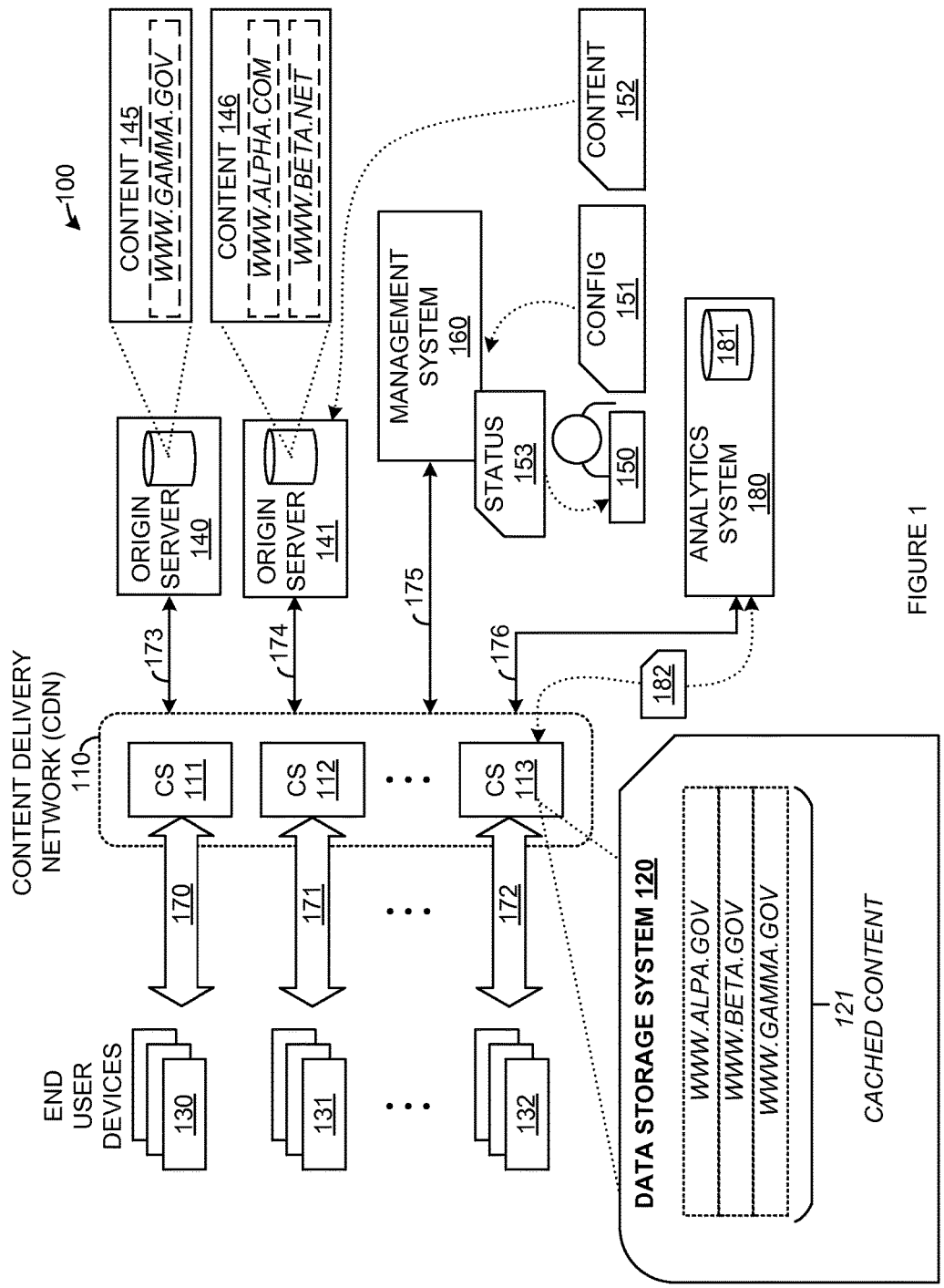
FIG. 1 illustrates a communication system.

FIG. 1 illustrates a communication system. Communication system 100 includes content delivery network 110, end user devices 130-132, origin servers 140-141, management system 160, and analytics system 180. Content delivery network 110 includes one or more content servers (CS) 111-113. Each of content servers 111-113 can include one or more data storage systems, such as data storage system 120 of content server 113. End user devices 130-132 are representative of a plurality of end user devices which can request and receive network content, and any number of end user devices 130-132 can be associated with each of content servers 111-113. Content servers 111-113 and end users 130-132 communicate over associated network links 170-172. Content delivery network 110 and origin servers 140-141 communicate over associated network links 173-174. Content delivery network 110 and management system 160 communicate over link 175. Content delivery network 110 and analytics system 180 communicate over link 176. Although not shown in FIG. 1 for clarity, each of content servers 111-113 can also communicate with each other over one or more network links.

To further illustrate FIG. 1, a brief description of the operation of communication system 100 is included. In operation, end user devices 130-132 request network content, such as content 145-146 associated with origin servers 140-141. Instead of these requests being handled by the individual origin servers 140-141, individual content servers 111-113 of content delivery network 110 receive the content requests over ones of links 170-172 and processes the content requests for delivery of the content to the associated end user devices 130-132. Requested network content that is already stored in ones of content servers 111-113 can be provided quickly to the end user devices, while network content that is not already stored in ones of content servers 111-113 can be responsively requested by an associated one of content servers 111-113 from an appropriate origin server 140-141 for delivery by the content server 111-113 and possible caching by the content servers 111-113. In this manner, each of content servers 111-113 can act as intermediary proxy nodes to provide local and fast access for end user devices 130-132 to network content of origin servers 140-141 without burdening origin servers 140-141. For example, content server 113 includes cached content 121, which can include at least portions of any of the content originated at origin servers 140-141.

Data storage system 120 shows exemplary cached content for content server 113, although any of the content servers of FIG. 1 can include similar content. Each web page is indicated by a domain name or web address, namely www.alpha.com, www.beta.net, and www.gamma.gov.

Management system 160 handles configuration changes and status information collection and delivery for system operators and for the origin server operators or managers. For example, operator device 150 can transfer configuration 151 for delivery to management system 160, where configuration 151 can alter the handling of network content requests by content servers 111-113, among other operations. Also, management system 160 can monitor status information for the operation of content servers 111-113, such as operational statistics, and provide this status information as 153 to operator device 150. Furthermore, operator device 150 can transfer content 152 for delivery to origin servers 140-141 to include in content 145-146. Although one operator device 150 is shown in FIG. 1, it should be understood that this is merely representative and communication system 100 can include many operator devices for receiving status information, providing configuration information, or transferring content to origin servers.

Analytics system 180 can include communication interfaces, network interfaces, processing systems, computer systems, microprocessors, storage systems, storage media, or some other processing devices or software systems, and can be distributed among multiple devices. Examples of analytics system 180 can include software such as an operating system, logs, databases, utilities, drivers, networking software, and other software stored on a computer-readable medium.

Content servers 111-113, origin servers 140-141, management system 160, and analytics system 180 can each include communication interfaces, network interfaces, processing systems, computer systems, microprocessors, storage systems, storage media, or some other processing devices or software systems, and can be distributed among multiple devices. Examples of content servers 111-113, origin servers 140-141, management system 160, and analytics system 180 can each include software such as an operating system, logs, databases, utilities, drivers, networking software, and other software stored on a computer-readable medium. Content delivery network 110, in addition to including content servers 111-113, can include equipment and links to route communications between content servers 111-113 and any of end user devices 130-132, origin servers 140-141, management system 160, and analytics system 180, among other operations.

End user devices 130-132 can each be a user device, subscriber equipment, customer equipment, access terminal, smartphone, personal digital assistant (PDA), computer, tablet computing device, e-book, Internet appliance, media player, game console, smartwatch, or some other user communication apparatus, including combinations thereof.

Communication links 170-176 each use metal, glass, optical, air, space, or some other material as the transport media. Communication links 170-176 can each use various communication protocols, such as wireless communications, cellular communications, IEEE 802.11 (WiFi), Long Term Evolution (LTE), Time Division Multiplex (TDM), asynchronous transfer mode (ATM), Internet Protocol (IP), Ethernet, synchronous optical networking (SONET), hybrid fiber-coax (HFC), circuit-switched, communication signaling, or some other communication format, including combinations, improvements, or variations thereof. Communication links 170-176 can each be a direct link or can include intermediate networks, systems, or devices, and can include a logical network link transported over multiple physical links. Although one main link for each of links 170-176 is shown in FIG. 1, it should be understood that links 170-176 are merely illustrative to show communication modes or access pathways. In other examples, further links can be shown, with portions of the further links shared and used for different communication sessions or different content types, among other configurations. Communication links 170-176 can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

Content delivery network 110 (which has at least content servers 111-113) provides content to end users 130-132 on behalf of origin servers 140-141. In order to help protect against a malicious attack on an origin server 140-141, privatized links 173-174 between at least one of content servers 111-113 and a respective origin server 140-141 are provided. In an embodiment, link 173 is privatized by provided a direct connection that does not route over the internet.

In an embodiment, link 174 is privatized by selecting a set of private IP addresses for us as IP addresses for origin server 141 to use for communication between content delivery network 110 and origin server 141. For example, a set of IP addresses that span the range of 23.235.33.0 to 23.235.33.255 (a.k.a., a /24 range) may be selected by management system 160 or configuration 151 to be the private IP addresses used by origin server 141 to communicate with content delivery network 110. A first IP address of the set of private IP addresses is selected as origin server 141's IP address for communication on link 174 between origin server 141 and content delivery network 110. As long as communication link 174 is functioning adequately with origin server 141 using the first IP address, origin server 141 can continue to use the first IP address.

However, when it is determined that the first IP address is under malicious attack (e.g., it is the target of a DDoS attack), the use of the first IP address by origin server 141 subjects origin server 141 (and link 174) to the malicious attack. In response to the first IP address coming under attack, origin server 141 and content delivery network 110 are configured such that origin server will us a second IP address in the set of private IP addresses for communication between origin server 141 and content delivery network 110.

For example, origin server 141 and content delivery network 110 may be configured to use a set of IP addresses that span the range of 23.235.33.0 to 23.235.33.255 (a.k.a., a /24 IP address range) to be the private IP addresses used by origin server 141 to communicate with content delivery network 110. Origin server 141 may start by using, for example, the IP address 23.235.33.17 (a.k.a., a /32 IP address). When it is determined that the IP address 23.235.33.17 is under malicious attack, origin server 141 may be configured to use, for example, the IP address 23.235.33.78. Content delivery network 110 would also be configured such that is knows that the IP address 23.235.33.78 corresponds to origin server 141 and therefor directs its requests to the second IP address. Thus, since origin server 141 is no longer responding to the first IP address of 23.235.33.17 because it now responding to the second IP address of 23.235.33.78, the effect of the malicious attack on link 174 is reduced or eliminated. As each IP address comes under attack, content delivery network 110 and origin server 141 can each mutually switch the IP address used for communication with origin server 141 to a new IP address from the set of private IP addresses—thus mitigating or eliminating the effects of subsequent malicious attacks on origin server 141 and/or link 174.

In the previous example, the selected set of private IP addresses was a contiguous range of IP addresses. This set of example private IP addresses all shared a common routing prefix (i.e., 23.235.33.XXX, or a /24 range). However, it should be understood that a set of non-contiguous IP addresses could have been selected. These non-contiguous IP addresses may have more than one routing prefix. It should also be understood that origin server 141 and/or content delivery network may use a predetermined (e.g., randomized, formulaic, sequential, listed, etc.) order for selecting the next IP address to be used. It should also be understood that the set of IP private addresses may be in the range allocated to content delivery network 110. In this manner, it may be more difficult for attackers to differentiate between a content server 111-113 and origin server 141. Finally, it should be understood that after an IP address is determined to no longer be under attack, it may be reselected to be the IP address of origin server 141.

Figure 2:
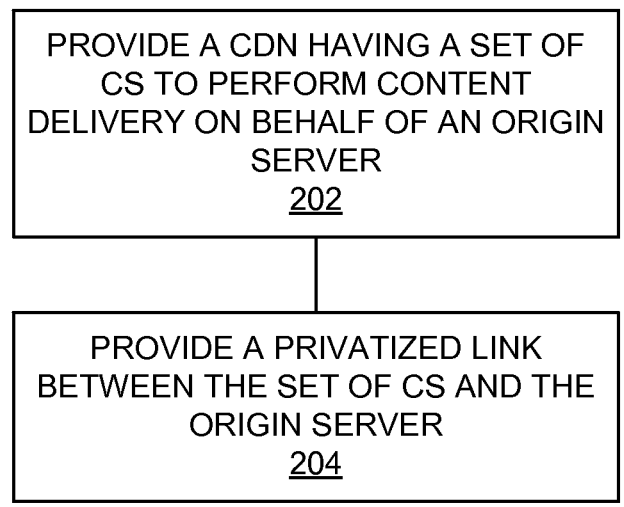
FIG. 2 illustrates a method of operating a content delivery network.

FIG. 2 illustrates a method of operating a content delivery network. The steps illustrated in FIG. 2 may be performed by one or more elements of communication system 100. A content delivery network having a set of content servers is provided to perform content delivery on behalf of an origin server (202). For example, content delivery network 110 having content servers 111-113 can be provided to supply the delivery of content 146 on behalf of origin server 141.

A privatized link between at least one of the content servers and the origin server is provided (204). For example, link 174 between content delivery network 110 and origin server 174 may be privatized. Link 174 may be privatized by establishing a direct connection between content delivery network 110 and origin server 141 that does not route over the internet. In another example, link 174 may be privatized by switching IP addresses for origin server 141 whenever the IP address being used by origin server 141 comes under malicious attack. The IP address to be used by origin server 141 after an attack may be selected from a predetermined range of contiguous IP addresses, or list of non-contiguous IP addresses. The IP address may be selected in a predetermined order (e.g., sequentially, randomly, formulaically, or from a non-sequential ordered list).

Figure 3:
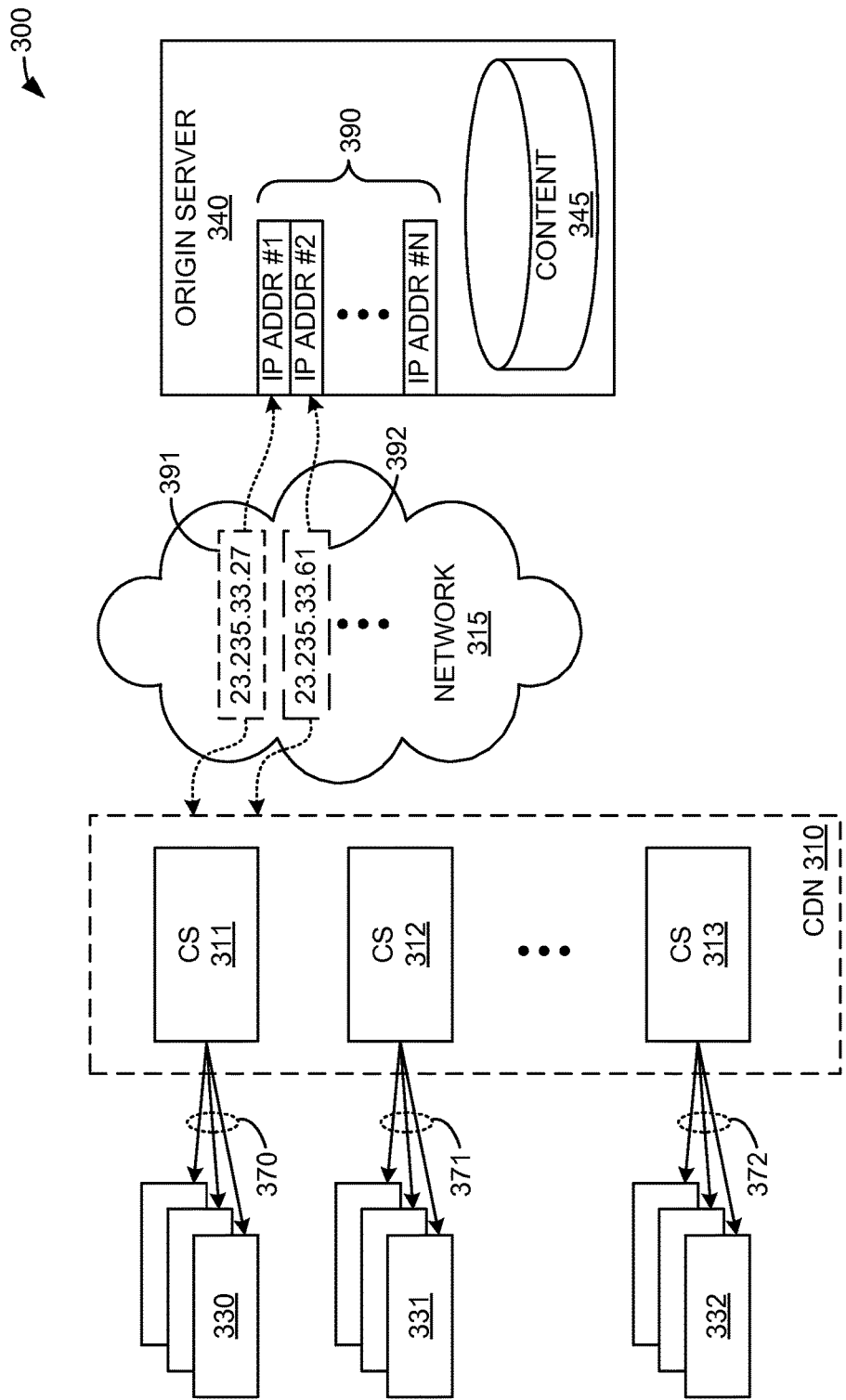
FIG. 3 illustrates a communication system.

FIG. 3 illustrates a communication system. In FIG. 3, communication system 300 comprises content delivery network 310, network 315, end user devices 330-332, and origin server 340. Content delivery network 310 include content servers 311-313. Origin server 340 includes content 345. Origin server 340 also includes IP address list 390. End user devices 330-332 are operatively coupled to content servers 311-313, respectively, by links 370-372. Origin server 340 is operatively coupled to content delivery network 310 (and thus content servers 311-313) via network 315. Network 315 can route communication between content delivery network 310 and content server 340 using at least IP address 391 or IP address 392 from list 390.

End user devices 330-332 are representative of a plurality of end user devices which can request and receive network content which is sourced form origin server 340. Any number of end user devices 330-332 can be associated with each of content servers 311-313. Content servers 311-313 and end users 330-332 communicate over associated network links 370-372. Content delivery network 310 and origin server 340 communicate via network 315. Each of content servers 311-313 can also communicate with each other over one or more network links (not shown in FIG. 3.)

End user devices 330-332 request network content, such as content 345, that is sourced by origin server 340. Instead of these requests being handled by the origin server 340, individual content servers 311-313 of content delivery network 310 receive the content requests over ones of links 370-372. The content servers 311-313 respond to and processes the content requests in order to deliver the content to the requesting end user device 330-332. Requested network content that is already stored in a content server 311-313 can be provided from the content server 311-313 directly to the requesting end user device 330-332 without first retrieving the content 345 from origin server 340. Network content that is not already stored in a content server 311-313 can be requested by a content server 311-313 from origin server 340. Once the content server 311-313 receives the content 345 from origin server 340, the content server 311-313 can deliver the content 345 to the requesting end user device 330-332. Each content server 311-313 that receives the content 345 may also cache the content 345. In this manner, each of content servers 311-313 can act as intermediary proxy nodes to provide local and fast access for end user 330-332 to network content 345 of origin server 340 without additionally burdening origin server 340.

Content servers 311-313, end user devices 330-332, and origin server 340 can each include communication interfaces, network interfaces, processing systems, computer systems, microprocessors, storage systems, storage media, or some other processing devices or software systems, and can be distributed among multiple devices. Examples of content servers 311-313 and origin server 340 each include software such as an operating system, logs, databases, utilities, drivers, networking software, and other software stored on a computer-readable medium. Content delivery network 310, in addition to including content servers 311-313, can include configurations, equipment, and links to route communications between content servers 311-313, end user devices 330-332, and origin server 340, among other operations.

End user devices 330-332 can each be a user device, subscriber equipment, customer equipment, access terminal, smartphone, personal digital assistant (PDA), computer, tablet computing device, e-book, Internet appliance, media player, game console, smartwatch, or some other user communication apparatus, including combinations thereof.

Communication system 300 can comprise wired and/or wireless communication networks that include processing nodes, routers, gateways, physical and/or wireless data links for carrying data among various network elements, including combinations thereof, and can include a local area network, a wide area network, and an internetwork (including the Internet), or portions thereof (e.g., network 315.) Communication system 300 can also comprise wireless networks, including base station, wireless communication nodes, telephony switches, internet routers, network gateways, computer systems, communication links, or some other type of communication equipment, and combinations thereof.

Wired network protocols that may be utilized by communication system 300 may comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols that may be utilized by communication system 300 may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Links between elements of communication system 300, can be, for example, twisted pair cable, coaxial cable or fiber optic cable, or combinations thereof. Links between elements of communication system 300 can be radio frequency, microwave, infrared, or other similar signal. Links between elements of communication system 300 can use a suitable communication protocol, for example, internet protocol, Ethernet, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Other network elements may be present to facilitate communication between among elements of communication system 300 which are omitted for clarity, including additional processing nodes, routers, gateways, and physical and/or wireless data links for carrying data among the various network elements.

In an embodiment, traffic between content delivery network 310 and origin server 340 routes through network 315. Network 315 may be a part of a shared or 'open' network such as part of the internet. To properly route communication between content delivery network 310 and origin server 340 via network 315, origin server 340 is associated with an IP address (e.g., IP address #1 391-23.235.33.27). Origin server 340 may be the subject of a malicious attack directed to an IP address it is currently using (e.g., IP address #1 391). This attack may disrupt the communication between content delivery network 310 and origin server 340. This disruption may prevent content delivery network 310 from serving some requests by end user devices 330-332.

When communication system 300 (and origin server 340 and/or content delivery network 310, in particular) determine (or are informed) that the IP address being used by origin server 340 is under attack, origin server 340 stops using that IP address and selects a new IP address for communication via network 315. For example, origin server may have been using IP address #1 391 for communication routed via network 315. When it is determined that IP address #1 is under attack (e.g., by a DDos attack via network 315), origin server 340 is configured with a new IP address (e.g., IP address #2 392) to use for communication with content delivery network 310 via network 315. This new IP address is selected from IP address list 390.

For example, origin server 340 and content delivery network 310 may be configured to use a set of IP addresses that span the range of, for example, 23.235.33.0 to 23.235.33.255 (a.k.a., a /24 IP address range) to be the private IP addresses in list 390 used by origin server 340 to communicate with content delivery network 310 via network 315. Origin server 340 may start by using, for example, IP address #1 (e.g., 23.235.33.27). When it is determined that IP address #1 (e.g., 23.235.33.27) is under malicious attack, origin server 340 is reconfigured to use, for example, IP address #2 (e.g., 23.235.33.61). Content delivery network 310 is also reconfigured such that is knows to use IP address #2 to route communication with origin server 340 via network 315. Thus, since origin server 340 is no longer responding to IP address #1 (e.g., 23.235.33.27) because it now responding to IP address #2 (e.g., 23.235.33.61), the effect of the malicious attack on origin server 340 is reduced or eliminated. As each IP address in IP address list 390 comes under attack, content delivery network 310 and origin server 340 cooperate to switch to another IP address from IP address list 390—thus mitigating or eliminating the effects of subsequent malicious attacks on origin server 340.

It should be understood that the list of IP addresses 390 may be a set of contiguous IP addresses (e.g., a /24 range). It should also be understood that IP address list 390 may comprise a non-contiguous list of IP addresses. These non-contiguous IP addresses may have more than one routing prefix. It should also be understood that origin server 340 and/or content delivery network 310 may use a predetermined (e.g., randomized, formulaic, sequential, listed, etc.) order for selecting the next IP address from IP address list 390. It should also be understood that the members of IP address list 390 may be a the range allocated to content delivery network 310. Finally, it should be understood that after an IP address is determined to no longer be under attack, it may be reselected from IP address list 390 to be the IP address of origin server 340.

Figure 4:
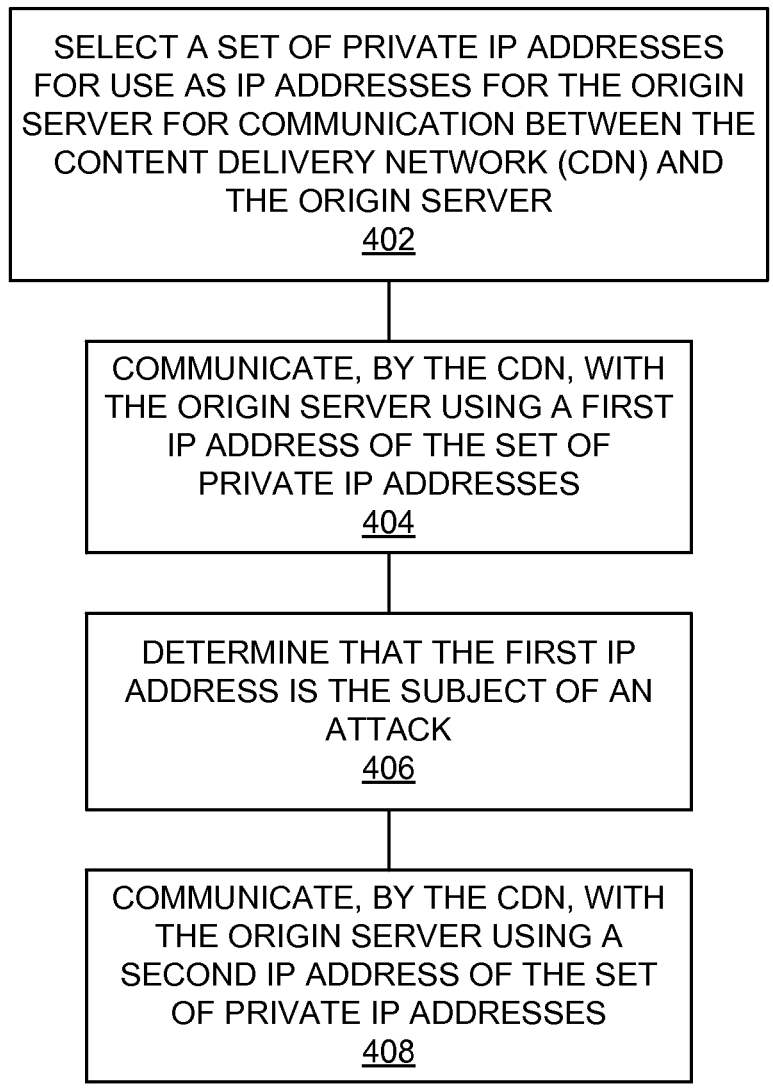
FIG. 4 illustrates a method of operating a content delivery network.

FIG. 4 illustrates a method of operating a content delivery network. The steps illustrated in FIG. 4 may be performed by one or more elements of communication system 100 and/or communication system 300. A set of private IP addresses are selected for use as IP addresses for the origin server for communication between the content delivery network and the origin server (402). For example, IP addresses list 390 may be selected for use as possible IP addresses for origin server 340. The association between origin server 340 and the IP addresses on IP addresses list 390 may be kept secret, or hidden, from other users of network 315.

The content delivery network communicates with the origin server using a first IP address of the set of private IP addresses (404). For example, content delivery network 310 may us IP address #1 (e.g., 23.235.33.27) from IP address list 390 to route communication with origin server 340 through network 315.

It is determined that the first IP address is the subject of an attack (406). For example, origin server 340 may determine that its network interface associated with IP address #1 (e.g., 23.235.33.27) is the subject of a malicious attack (e.g., a SYN flood attack or a UDP flood attack) coming via network 315.

The content delivery network communicates with the origin server using a second IP address of the set of private IP addresses (408). For example, in response to detecting an attack on IP address #1 (e.g., 23.235.33.27), content delivery network 310 and/or origin server 340 may be reconfigured to use IP address #2 (e.g., 23.235.33.61) from IP address list 390 to route communication with origin server 340 through network 315.

Figure 5:
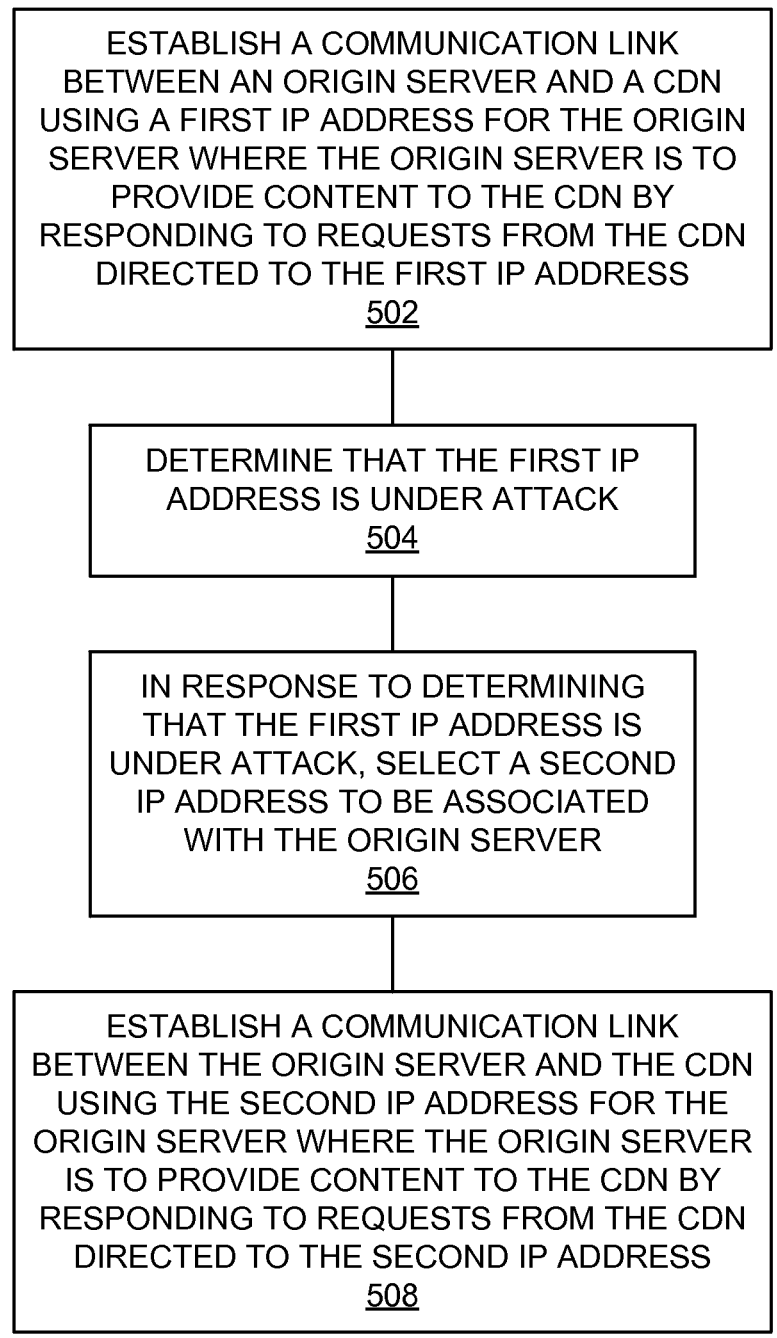
FIG. 5 illustrates a method of responding to a malicious attack on an origin server.

FIG. 5 illustrates a method of responding to a malicious attack on an origin server. The steps illustrated in FIG. 5 may be performed by one or more elements of communication system 100 and/or communication system 300. A communication link is established between an origin server and a content delivery network using a first IP address for the origin server where the origin server is to provide content to the content delivery network by responding to requests for the content delivery network directed to the first IP address (502). For example, a communication link via network 315 can be established between origin server 340 and content delivery network 310 where origin server 340 responds to requests for content 345 that are directed to IP address #1 (e.g., 23.235.33.27).

It is determined that the first IP address is under attack (504). For example, origin server 340 may determine that its network interface associated with IP address #1 (e.g., 23.235.33.27) is under attack using traffic directed to IP address #1 (e.g., 23.235.33.27) via network 315.

In response to determining that the first IP address is under attack, a second IP address is selected to be associated with the origin server (506). For example, in response to detecting an attack on IP address #1 (e.g., 23.235.33.27), content delivery network 310 and/or origin server 340 may select IP address #2 (e.g., 23.235.33.61) from IP address list 390 to be associated with origin server 340.

A communication link is established between the origin server and the content delivery network using the second IP address for the origin server where the origin server is to provide content to the content delivery network by responding to requests for the content delivery network directed to the second IP address (508). For example, origin server 340 and content delivery network 310 can be reconfigured to use IP address #2 for a communication link via network 315 where origin server 340 is to respond to requests for content 345 that are directed to IP address #2 (e.g., 23.235.33.61).

Figure 6:
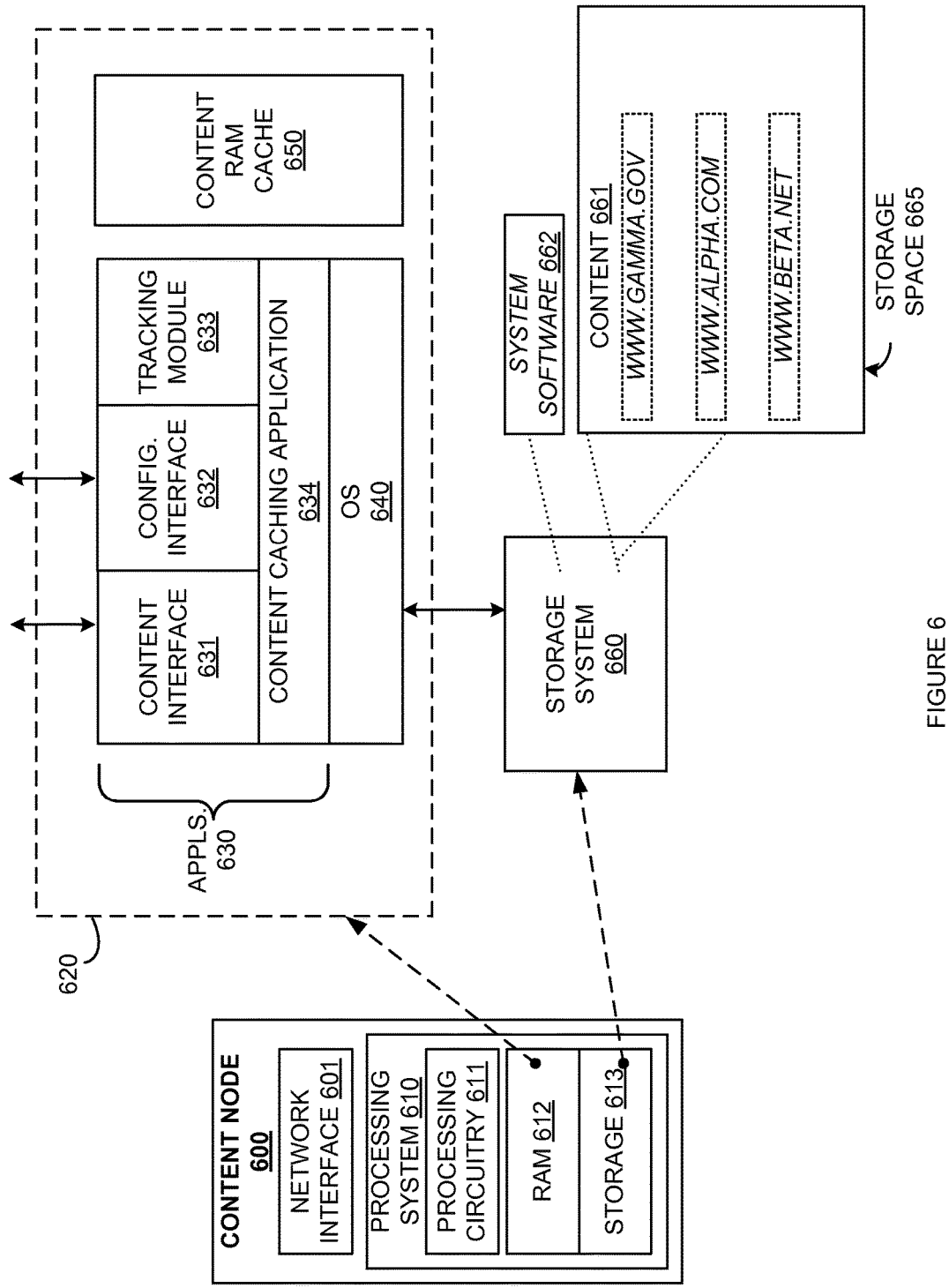
FIG. 6 illustrates a content node.

To further describe the equipment and operation of a content server, FIG. 6 is provided which illustrates content server 600. Content server 600 can be an example of content servers 111-113 of FIG. 1, and content servers 311-313 of FIG. 3, although variations are possible. Content server 600 includes network interface 601 and processing system 610. Processing system 610 includes processing circuitry 611, random access memory (RAM) 612, and storage 613, although further elements can be included, such as discussed in FIGS. 1 and 3. Example contents of RAM 612 are further detailed in RAM space 620, and example contents of storage 613 are further detailed in storage system 660.

Processing circuitry 611 can be implemented within a single processing device but can also be distributed across multiple processing devices or sub-systems that cooperate in executing program instructions. Examples of processing circuitry 611 include general purpose central processing units, microprocessors, application specific processors, and logic devices, as well as any other type of processing device. In some examples, processing circuitry 611 includes physically distributed processing devices, such as cloud computing systems.

Network interface 601 includes one or more network interfaces for communicating over communication networks, such as packet networks, the Internet, and the like. The network interfaces can include one or more local or wide area network communication interfaces which can communicate over Ethernet or Internet protocol (IP) links. Network interface 601 can include network interfaces configured to communicate using one or more network addresses, which can be associated with different network links. Examples of network interface 601 include network interface card equipment, transceivers, modems, and other communication circuitry.

RAM 612 and storage 613 together can comprise a non-transitory data storage system, although variations are possible. RAM 612 and storage 613 can each comprise any storage media readable by processing circuitry 611 and capable of storing software. RAM 612 can include volatile and nonvolatile, removable and non-removable media implemented in any method or technology for storage of information, such as computer readable instructions, data structures, program modules, or other data. Storage 613 can include non-volatile storage media, such as solid state storage media, flash memory, phase change memory, magnetic memory, or as illustrated by storage system 460 in this example. RAM 612 and storage 613 can each be implemented as a single storage device but can also be implemented across multiple storage devices or sub-systems. RAM 612 and storage 613 can each comprise additional elements, such as controllers, capable of communicating with processing circuitry 611.

Software stored on or in RAM 612 or storage 613 can comprise computer program instructions, firmware, or some other form of machine-readable processing instructions having processes that when executed a processing system direct content server 600 to operate as described herein. For example, software drives content server 600 to receive requests for content, determine if the content is stored in content server 600, retrieve content from origin servers, transfer content to end user devices, manage data storage systems for handling and storing the content, among other operations. The software can also include user software applications. The software can be implemented as a single application or as multiple applications. In general, the software can, when loaded into a processing system and executed, transform the processing system from a general-purpose device into a special-purpose device customized as described herein.

RAM space 620 illustrates a detailed view of an example configuration of RAM 612. It should be understood that different configurations are possible. RAM space 620 includes applications 630, operating system (OS) 640, and content RAM cache 650. Content RAM cache 650 includes RAM space for temporary storage of content, such as dynamic random access memory (DRAM).

Applications 630 include content interface 631, configuration interface 632, tracking module 633, and content caching application 634. Content caching application 634 handles caching of content and management of storage spaces, such as content RAM cache 650 and storage space 665, as well as exchanges content, data, and instructions via content interface 631, configuration interface 632, and tracking module 633. Content caching application 634 can comprise a custom application, Varnish caching software, hypertext transfer protocol (HTTP) accelerator software, or other content caching and storage applications, including variation, modifications, and improvements thereof. Applications 630 and OS 640 can reside in RAM space 620 during execution and operation of content server 600, and can reside in system software storage space 662 on storage system 660 during a powered-off state, among other locations and states. Applications 630 and OS 640 can be loaded into RAM space 620 during a startup or boot procedure as described for computer operating systems and applications.

Content interface 631, configuration interface 632, and tracking module 633 each allow a user to interact with and exchange data with content caching application 634. In some examples, each of content interface 631, configuration interface 632, and tracking module 633 comprise an application programming interface (API). Content interface 631 allows for exchanging content for caching in content server 600 by content caching application 634, and can also receive instructions to purge or erase data from content server 600. Content interface 631 can retrieve tracking elements as well as network and web page content from origin servers for delivery to end users. Configuration interface 632 allows for altering the configuration of various operational features of content caching application 634. In some examples, configuration interface 632 comprises a scripting language interface, such as Varnish Configuration Language (VCL), Perl, PHP, Javascript, or other scripting or interpreted language-based interfaces. Tracking module 633 can log and track requests by end user devices for tracking elements found in various web pages cached by content node 600, and deliver log data or tracking information to external systems, among other operations. Content interface 631, configuration interface 632, and tracking module 633 can each communicate with external systems via network interface 601 over any associated network links.

Storage system 660 illustrates a detailed view of an example configuration of storage 613. Storage system 660 can comprise flash memory such as NAND flash or NOR flash memory, phase change memory, magnetic memory, among other solid state storage technologies. As shown in FIG. 6, storage system 660 includes system software 662, as well as content 661 stored in storage space 665. As described above, system software 662 can be a non-volatile storage space for applications 630 and OS 640 during a powered-down state of content server 600, among other operating software. Content 661 includes cached content, such as the web content examples in FIG. 1, which can include text, data, pictures, video, audio, web pages, scripting, code, dynamic content, or other network content. Content 661 can also include tracking elements, such as transparent GIFs, web bugs, Javascript tracking elements, among other tracking elements. In this example, content 661 includes network content and web pages associated with one or more websites, as indicated by www.gamma.gov, www.alpha.com, and www.beta.net.

Content server 600 is generally intended to represent a computing system with which at least software 630 and 640 are deployed and executed in order to render or otherwise implement the operations described herein. However, content server 600 can also represent any computing system on which at least software 630 and 640 can be staged and from where software 630 and 640 can be distributed, transported, downloaded, or otherwise provided to yet another computing system for deployment and execution, or yet additional distribution.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of protecting a website from attack, comprising:

providing a content delivery network (CDN) having a set of content servers (CS) to provide content delivery on behalf of a set of participating content providers, at least one of the set of participating content providers sourcing content for delivery by the CDN from an origin server;

providing a set of private Internet Protocol (IP) addresses assigned to the origin server for communication between the CDN and the origin server;

transmitting a request for content from the CDN to the origin server using a first IP address selected from the set of private IP addresses;

receiving the content at the CDN from the origin server in response to the request for content;

identifying a malicious attack on the first IP address;

in response to identifying the malicious attack, selecting a second IP address from the set of private IP addresses;

subsequent to selecting the second IP address, transmitting a request for additional content from the CDN to the origin server using the second IP address; and receiving the additional content at the CDN from the origin server in response to the request for additional content.

2. The method of claim 1, wherein the set of private IP addresses is noncontiguous.

3. The method of claim 1, wherein the set of multiple IP addresses lie within a private IP address range allocated to the content delivery network.

4. The method of claim 1, wherein the second IP address is based on a predetermined order of IP addresses to be selected from the set of private IP addresses.

5. A communication system, comprising:

a content delivery network (CDN) having a set of content servers (CS) to provide content delivery on behalf of a set of participating content providers, at least one of the set of participating content providers sourcing content for delivery by the CDN from an origin server;

a set of private Internet Protocol (IP) addresses assigned to the origin server for communication between the CDN and the origin server; and wherein the CDN is configured to:

transmit a request for content to the origin server using a first IP address selected from the set of private IP addresses;

receive the content from the origin server in response to the request for content;

identify a malicious attack on the first IP address;

in response to identifying the malicious attack, select a second IP address from the set of private IP addresses;

subsequent to selecting the second IP address, transmit a request for additional content to the origin server at the second IP address; and receive the additional content from the origin server in response to the request for additional content.

6. The communication system of claim 5, wherein the set of private IP addresses is noncontiguous.

7. The communication system of claim 6, wherein the set of private IP addresses are contiguous within a single routing prefix.

8. The communication system of claim 5, wherein the second IP address is selected from the set of private IP addresses based on the first IP address.

9. The communication system of claim 5, wherein the set of private IP addresses lies within a routing prefix address range allocated to the content delivery network.

10. A method of supplying content to a content delivery network (CDN), comprising:

establishing a communication link between an origin server and the CDN using a first Internet Protocol (IP) address selected for the origin server from a set of private Internet Protocol (IP) addresses assigned to the origin server, the origin server to provide content to the CDN by responding to requests from the CDN directed to the first IP address;

determining that the first IP address is under attack;

in response to determining the first IP address is under attack, selecting a second IP address from the set of private Internet Protocol (IP) addresses assigned to the origin server; and establishing a communication link between the origin server and the CDN using the second IP address for the origin server, the origin server to provide content to the CDN by responding to requests from the CDN directed to the second IP address.

11. The method of claim 10, wherein the first and second IP addresses are selected according to a predetermined order known to both the CDN and the origin server.

12. The method of claim 3, further comprising:

determining that the first IP address is not under attack; and in response to determining the first IP address is not under attack, selecting the first IP address to be associated with the origin server.

13. The method of claim 12, wherein the first IP address is selected based on determining that the second IP address is under attack.

* * * * *